May 28, 1968     A. EISELE     3,385,147
EXPANSIBLE BORE-FITTING HOLDER
Filed Aug. 12, 1966
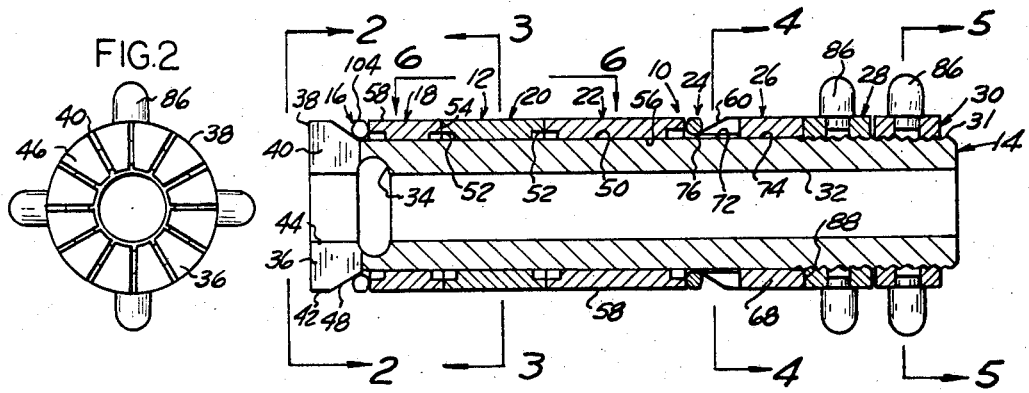
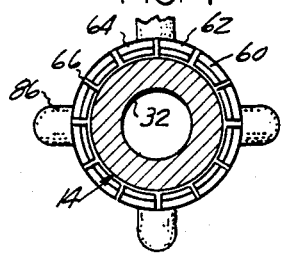
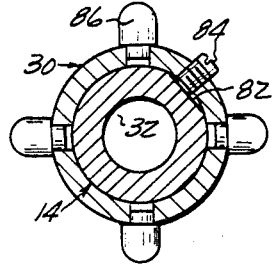
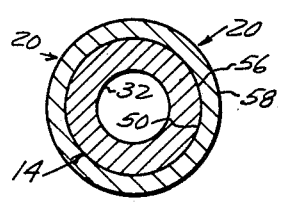
INVENTOR
ANDREW EISELE
BY Barthel & Bugbee
ATTORNEYS

United States Patent Office 3,385,147
Patented May 28, 1968

3,385,147
EXPANSIBLE BORE-FITTING HOLDER
Andrew Eisele, 20460 Brookwood Ave.,
Dearborn Heights, Mich. 48127
Filed Aug. 12, 1966, Ser. No. 572,075
7 Claims. (Cl. 82—44)

This invention relates to article holders and, in particular, to expansible bore-fitting holders.

The objects of the invention include provision of an expansible bore-fitting holder which can be expanded or contracted to snugly fit a bore, even a bore which is tapered or out of round; also one which includes component collars or sleeves that can be rearranged to adapt the expansible holder to fit different lengths of bores or depths of holes. Such an expansible holder, for example, is employed for rotatably supporting a bore concentricity gauge within a reference bore in order to measure the relative concentricity of a workpiece bore, in which case the holder possesses a longitudinal bore for snugly but rotatably receiving the stem or pilot portion of the bore concentricity gauge. By omitting this longitudinal bore and providing centers, this holder becomes an expansible arbor upon which workpieces may be firmly held and rotatably supported for turning or other machining operations.

In the drawing:

FIGURE 1 is a central longitudinal section through an expansible bore-fitting holder, according to one form of the invention, arranged to fit an elongated bore and rotatably support another device, such as a bore concentricity gauge;

FIGURE 2 is a left-hand end elevation of FIGURE 1;

FIGURES 3, 4 and 5 are respectively cross-sections taken along the lines 3—3, 4—4 and 5—5 in FIGURE 1;

FIGURE 6 is a side elevation of the expansible bore-fitting holder shown in FIGURE 1; and FIGURE 7 is a fragmentary central vertical section through a modification of the expansible bore-fitting holder of FIGURE 1 modified to serve as an expansible arbor by omitting the central bore and providing its opposite ends with recessed centers, in order to rotatably support a bored article such as a sleeve or bushing.

Referring to the drawing in detail, FIGURES 1 to 6 inclusive show an expansible bore-fitting holder, generally designated 10, centrally bored to receive another device, for example the stem of a bore concentricity gauge, such as that shown in my previous Patents No. 2,884,699 of May 5, 1959 for Bore Concentricity Gauge Holder and 3,209,460 of Oct. 5, 1965 for Convertible Bore Concentricity Gauge. The expansible bore-fitting holder 10 (FIGURES 1 and 6) consists generally of an elongated central tubular mandrel 14 carrying in succession from one end to the other an interrupted forward spring split ring 16, a spacer unit 12 including a succession of spacing sleeves 18, 20, and 22 of different lengths, one or more of which may be rearranged in use, a rearward split spring ring 24 identical to the forward split ring 16, a slidable ring-expanding cone or ring expander 26, a cone-propelling nut 28, and a handle nut 30. The spacing sleeves 18, 20 and 22 are of smaller external diameters than the rings 16 and 24. Both nuts 28 and 30 are threaded onto the externally-threaded rearward end portion 31 of the tubular mandrel 14, the forward end of which is conical and radially slotted, as is also the slidable expanding cone 26. Each of the split rings 16 and 24 has a gap 25 in its periphery, rendering it discontinuous (FIGURE 4).

The central tubular mandrel 14 is in the form of an elongated tubular shaft containing a central longitudinal bore 32 extending from end to end and possessing an annular internal enlargement 34 of toroidal shape spaced rearwardly inward from the front face 36 of the mandrel 14. The forward end of the mandrel 14 terminates in a stationary conical expanding abutment head 38 which is so constituted by being provided with radial slots 40 (FIGURE 2) extending inward from its forward peripheral surface 42 to a central enlarged forward end bore 44 coaxial with the bore 32, and subdividing the head 38 into sector-shaped fingers 46. Rearwardly of the cylindrical outer surface 42, the stationary ring-expanding conical head 38 has a conical surface 48 which engages the inner periphery of the forward spring split ring 16 so as to cause its peripheral gap 25 to widen or narrow, as the case may be, according to whether the movable expanding cone 26 is moved forward or rearward along the mandrel 14 by the propelling nut 28.

The conical surface 48 on the forward head 38 terminates at its rearward edge at the forward end of the cylindrical outer surface 50 of the mandrel 14, the rearward end of which terminates in the threaded portion 31 thereof. The spacing sleeves 18, 20 and 22 are snugly but slidably mounted on the cylindrical outer surface 50 of the mandrel 14 and each has opposite end counterbores 52 extending from its annular surface 54 to its cylindrical internal surface 56. As a result, the annular end surfaces 54 engage either the split ring 16 or 24 or engage one another, according to their particular arrangement. Each of the spacing sleeves 18, 20 and 22 has a cylindrical outer surface 58.

The split rings 16 and 24 are preferably made of high-grade spring steel, such as that used for piano wires, and because of the high quality steel, they are capable of being expanded outwardly a radial distance as great as fifty thousandths of an inch (0.05 inch), yet will return to their original size when the expanding pressure is withdrawn, without undergoing permanent deformation.

The rearward split ring 24 is simultaneously expanded and pushed forward by the component conical outer surfaces 60 of the total conical interrupted annular surface 62 of sector-shaped expanding fingers 64. The fingers 64 are separated from one another by radial slots 66 extending forward from the annular body 68 of the slidable expanding cone 26, which has an annular radial rearward end surface 69. The radial slots 66 extend inward from the conical surface 62 to the component cylindrical surface 70 of a counterbore 72 which is of slightly larger diameter than the bore 74 through the body 68 of the expanding cone 26. The fingers 64 have relatively sharp arcuate forward edges 76 (FIGURE 1) which engage the inner surface of the rearward spring split ring 24 so as to urge it outward and expand it as explained below in connection with the operation of the invention. The body 68 of the movable expanding cone 26 has a cylindrical outer surface 78 and an annular rearward surface 80.

The rearward end portion of the tubular mandrel 14 is provided with a longitudinally-extending flat surface 82 (FIGURE 5) which interrupts the threaded portion 31 thereof. The handle nut 30 is drilled and threaded radially to receive a set screw 84, the inner end of which engages the flat surface 82 and prevents rotation of the handle nut 30 relatively to the tubular mandrel 14. The cone-propelling nut 28 lacks the radial drilling and threading and set screw 84, but otherwise the two nuts 28 and 30 are of identical construction. Each is internally threaded to threadedly engage the threaded external surface 31 on the rearward end portion of the mandrel 14, and each is drilled radially at 90-degree intervals to receive the inner ends of round-headed knobs 86 (FIGURE 5) by which each nut 28 or 30 may be rotated or held against rotation, as desired. The propelling nut 30 has an annular forward end surface 88 which engages the annular rearward end surface 69 of the propelling cone 26.

The modified bore-fitting holder 90 of FIGURE 7 is generally similar to the holder 10 of FIGURES 1 to 6 inclusive, and corresponding parts are designated with the same reference numerals. The holder 90 omits the central bore 32 of the tubular mandrel 14 of the expansible bore-fitting holder 10 of FIGURES 1 to 6 inclusive, except for the enlargement 34 and end bore 44 into which the radial slots 40 extend. The opposite ends 94 and 96 of the thus-provided solid mandrel 98 (FIGURE 7) are provided with axial conical center recesses 100 and 102 for receiving the usual pointed conical ends of the conventional live and dead centers (not shown) of the lathe or other machine tool in which the expansible bore-fitting holder is to be used. The latter is driven from the live head or face plate of the lathe or other machine tool carrying the live center, by any suitable means, such as by a conventional lathe dog, in a manner well known to mechanics skilled in the art of using machine tools.

Prior to the operation of the expansible bore-fitting holder 10 or 90 of the present invention, either as an expansible bushing as in FIGURES 1 to 6 inclusive or as an expansible arbor as in FIGURE 7, the operator measures the axial length of the bore to be fitted and then arranges on the cylindrical surface 50 of the spacer sleeve or combination of sleeves 18, 20 and/or 22 to approximately equal this axial length. If this axial length requires shortening of the overall spacer sleeve length, the operator loosens the set screw 84 (FIGURE 5) and by means of the knobs 86 unscrews and completely removes both of the nuts 28 and 30 from the threaded end portion 31, together with the expanding cone 26 and rearward spring split ring.

The operator then removes one or more of the spacer sleeves 18, 20 and 22, leaving a spacer sleeve or combination of sleeves which will approximately equal the axial length of the bore to be fitted. He then replaces the rearward split ring 24, expanding cone 26 and propelling nut 28, tightening the latter until it lightly engages the split ring 24 without expanding it. He then slides on any unused spacer sleeves 18, 20 or 22 behind the nut 28 for convenience of storage, and finally threads the handle nut 30 onto the threaded portion 31, and tightens the set screw 84 against the flat surface 82 to lock the handle nut 30 in a fixed position. If he is to measure the bore concentricity, he passes the pilot portion or stem of the bore concentricity gauge through the expansible bushing 10 in a manner analogous to that shown in my above-mentioned Patent No. 2,884,699.

In the operation of the invention as an expansible bushing, the operator inserts the forward portion of the expansible bore-fitting holder 10 into the reference bore to be fitted until both split rings 16 and 24 engage the surface of the bore. He then expands the split rings 16 and 24 into tight engagement with the bore wall by holding the handle nut 30 in one hand and rotating the propelling nut 28 with the other hand, so as to cause it to move along the threaded portion 31, pushing the expanding cone 26 ahead of it and the latter in turn pushing the rearward split ring 24 against the spacers 18, 20 and/or 22 being used. This action consequently causes the forward end 54 of the foremost spacer 18, 20 or 22 to move forward along and up the conical surface 48, expanding as it does so and widening its peripheral gap 25 until it firmly engages the adjacent bore surface.

Meanwhile, the sharp forward edges 76 of the fingers 64 engage the inner surface of the rearward split ring 24 and their conical surface components 60 cause expansion of the split ring 24 until it, too, firmly engages the adjacent side wall surface of the bore. It will be understood, of course, that the major diameters of the split rings 16 and 24 are in excess of the diameters of the cylindrical surfaces 42 and 58.

With the expansible bore-fitting holder 10 thus locked firmly in the reference bore, the operator moves the forward portion of the stem of the bore concentricity gauge into the workpiece bore and then rotates in while the tip of the feeler sweeps around the bore surface and conveys any irregularity or eccentricity thereof through the motion-transmitting mechanism to the dial indicator on the outer end of the bore concentricity gauge. The operation of such gauges is well known to those skilled in the precision measuring art and hence requires no detailed description here. The operator then removes the expansible holder 10 after loosening it in its reference bore, by reversing the above-described procedure.

In the operation of the invention as an expansible arbor (FIGURE 7), a similar procedure is followed with the expansible bore-fitting holder 90, in that spacer sleeves 18, 20 and/or 22 are selected and stacked along the solid mandrel 98 to approximately equal the axial length of the workpiece bore into which it is to be threaded. Thereupon the movable expanding cone 26, propelling nut 28 and handle nut 30 are replaced on the threaded rearward portion 31, as described above. The forward end of the expansible arbor 12 is then inserted in the bore of the workpiece and the propelling nut 28 operated in the manner described above to propel the expanding cone 26 forward and thereby expand the spring split rings 16 and 24 firmly into tight engagement with the workpiece bore.

The operator then transfers this assembly to the machine tool in which further machining operations are to be performed, and moves the live and dead centers of the machine tool into engagement with the conical center recesses 100 and 102. If the workpiece is merely to be inspected between such centers, the operator may manually rotate it and the expansible bore-fitting holder 90 on which it is mounted while the portion of the workpiece being inspected is checked by a suitable gauge, such as a test dial indicator. If, on the other hand, the workpiece is to be machined further, the operator arranges for the driving connection between the expansible bore-fitting holder 90 and the faceplate or other rotary head on the machine tool, such as by attaching a conventional lathe dog to the arbor and inserting the perpendicular driving arm of the lathe dog into the notch or slot ordinarily provided for it in the faceplate of the lathe or other machine tool. Machining is then carried out in the usual conventional manner well known to mechanics. The workpiece is then removed from the expansible bore-fitting holder 90 by reversing the above-described procedure to loosen and contract the expansible arbor 12.

Either of the expansible bore-fitting holders 10 or 90 has the further advantage of tightly fitting a slightly-tapered bore, in which case one of the spring split rings 16 or 24 is automatically expanded to a greater major diameter than the other ring. By the same token, the holder 10 or 90 will fit a bore which is slightly out of round.

It will be understood that where the split rings 16 and 24 are of true toroidal shape, they possess circular line contacts with the bore which they engage. If annular surface contacts are desired, each ring 16 and 24 is provided on its periphery with an annular flattened surface of the desired axial width.

What I claim is:
1. An expansible bore-fitting holder, comprising
an elongated body having an enlarged forward end portion with a rearwardly-tapered ring-expanding surface thereon,
a first resilient split ring mounted on said body in engagement with said rearwardly-tapered surface,
a spacer unit having a bore telescopingly receiving said body and having a forward end engaging said first split ring,
a second resilient split ring mounted on said body in engagement with the rearward end of said spacer unit,
a ring expander mounted on said body and having a forwardly-tapered portion disposed in engagement with said second split ring, and means for urging said ring expander into radially-expanding engagement with said second split ring and concurrently urging said second split ring and said spacer unit and said first split ring axially along said body member toward said enlarged rearwardly-tapered forward end and thereby effecting radially-expanding engagement of said rearwardly-tapered surface with said first split ring, said expander having a substantially sharp forward edge internally engaging said second split ring and said expander having circumferentially-spaced slots therein dividing said tapered portion into spaced rearward fingers.

2. An expansible bore-fitting holder, according to claim 1, wherein said tapered portion of said expander has a counterbore within the forwardly-tapered portion thereof providing a clearance between said subdivisions and said body.

3. An expansible bore-fitting holder, according to claim 1, wherein said enlarged forward end portion of said body has circumferentially-spaced slots therein subdividing said enlarged forward end portion into spaced forward fingers.

4. An expansible bore-fitting holder, according to claim 1, wherein said body has an axial bore within said enlarged forward end portion.

5. An expansible bore-fitting holder, according to claim 4, wherein said bore extends axially through said body from end to end thereof.

6. An expansible bore-fitting holder, comprising an elongated body having an enlarged forward end portion with a rearwardly-tapered ring-expanding surface thereon, a first resilient split ring mounted on said body in engagement with said rearwardly-tapered surface, a spacer unit having a bore telescopingly receiving said body and having a forward end engaging said first split ring, a second resilient split ring mounted on said body in engagement with the rearward end of said spacer unit, a ring expander mounted on said body and having a forwardly-tapered portion disposed in engagement with said second split ring, and means for urging said ring expander into radially-expanding engagement with said second split ring and concurrently urging said second split ring and said spacer unit and said first split ring axially along said body member toward said enlarged rearwardly-tapered forward end and thereby effecting radially-expanding engagement of said rearwardly-tapered surface with said first split ring, said means including an externally-threaded rearward end portion on said body and an internally-threaded propelling nut rotatably mounted on said externally-threaded portion and engageable with said ring expander, an internally-threaded handle nut being threaded upon said externally-threaded rearward end portion adjacent said propelling nut and being fixedly secured to said body.

7. An expansible bore-fitting holder, according to claim 6, wherein said spacer unit includes a plurality of sleeves disposed in end-to-end engagement with one another axially of said body.

References Cited

UNITED STATES PATENTS 2,365,980　12/1944　Thomas _____ 82—44 XR
2,734,749　2/1956　Benjamin _____ 279—2

FOREIGN PATENTS 261,853　12/1926　Great Britain.

LEONIDAS VLACHOS, *Primary Examiner.*